United States Patent
Hellwig et al.

(10) Patent No.: US 7,373,445 B2
(45) Date of Patent: May 13, 2008

(54) METHOD AND APPARATUS FOR ALLOCATING BUS ACCESS RIGHTS IN MULTIMASTER BUS SYSTEMS

(75) Inventors: Frank Hellwig, München (DE); Dietmar König, München (DE)

(73) Assignee: Infineon Technologies AG, Munich (DE)

( * ) Notice: Subject to any disclaimer, the term of this patent is extended or adjusted under 35 U.S.C. 154(b) by 188 days.

(21) Appl. No.: 11/087,062

(22) Filed: Mar. 21, 2005

(65) Prior Publication Data

US 2005/0223147 A1    Oct. 6, 2005

(30) Foreign Application Priority Data

Mar. 19, 2004   (DE)   .................. 10 2004 013 635

(51) Int. Cl.
*G06F 13/00*   (2006.01)

(52) U.S. Cl. ...................... 710/112; 710/243

(58) Field of Classification Search ............... 710/116, 710/123, 112, 243
See application file for complete search history.

(56) References Cited

U.S. PATENT DOCUMENTS

| | | | | |
|---|---|---|---|---|
| 4,463,445 A | * | 7/1984 | Grimes ..................... | 710/116 |
| 4,814,974 A | * | 3/1989 | Narayanan et al. ........ | 710/244 |
| 5,265,215 A | * | 11/1993 | Fukuda et al. ............ | 710/123 |
| 5,301,283 A | * | 4/1994 | Thacker et al. ........... | 710/116 |
| 5,553,248 A | * | 9/1996 | Melo et al. ................ | 710/116 |
| 5,560,016 A | * | 9/1996 | Fiebrich et al. ........... | 710/240 |
| 5,625,846 A | * | 4/1997 | Kobayakawa et al. ..... | 710/52 |
| 5,845,097 A | | 12/1998 | Kang et al. | |
| 5,854,906 A | * | 12/1998 | Van Loo .................... | 710/110 |
| 5,862,355 A | * | 1/1999 | Logsdon ................... | 710/116 |
| 6,026,459 A | * | 2/2000 | Huppenthal ............... | 710/116 |
| 6,073,132 A | * | 6/2000 | Gehman ...................... | 707/9 |
| 6,119,188 A | * | 9/2000 | Sheafor et al. ............ | 710/107 |
| 6,260,099 B1 | * | 7/2001 | Gilbertson et al. ........ | 710/240 |
| 6,286,083 B1 | * | 9/2001 | Chin et al. ................. | 711/151 |
| 6,441,479 B1 | * | 8/2002 | Ahn et al. .................. | 257/700 |
| 6,519,666 B1 | * | 2/2003 | Azevedo et al. ........... | 710/120 |

(Continued)

FOREIGN PATENT DOCUMENTS

DE    31 11 991 A1    10/1982

(Continued)

OTHER PUBLICATIONS

Structured Computer Organization, 1990, Third Edition, Andrew S. Tanenbaum, pp. 11-13.*

*Primary Examiner*—Paul R. Myers
(74) *Attorney, Agent, or Firm*—Maginot, Moore & Beck

(57) ABSTRACT

A method for allocating bus access rights is used in a multimaster bus system wherein addresses are explicitly allocated to master devices and each master device is assigned a priority value from an organized priority list of priority values. Requests from at least one master device to use the bus system to access a slave device are received, and the priority values of all requesting master devices are compared. If a sole requesting master device has the highest priority value access to the respective slave device is granted to that master device. If a plurality of requesting master devices have the same highest priority value access is successively granted to the requesting master devices having the same highest priority value on the basis of the address allocation of the master devices.

16 Claims, 4 Drawing Sheets

U.S. PATENT DOCUMENTS

| | | | |
|---|---|---|---|
| 6,665,760 B1 * | 12/2003 | Dotson | 710/240 |
| 6,704,821 B2 * | 3/2004 | Scandurra et al. | 710/243 |
| 6,782,441 B1 * | 8/2004 | Nguyen et al. | 710/240 |
| 6,804,736 B2 * | 10/2004 | Olarig | 710/240 |
| 6,910,088 B2 * | 6/2005 | LaBerge | 710/117 |
| 6,920,632 B2 * | 7/2005 | Donovan et al. | 718/103 |
| 7,051,133 B2 * | 5/2006 | Takata | 710/111 |
| 7,099,975 B2 * | 8/2006 | Brown et al. | 710/240 |
| 7,130,946 B2 * | 10/2006 | Abhay et al. | 710/242 |
| 2002/0010823 A1 | 1/2002 | Wenzel | |

FOREIGN PATENT DOCUMENTS

| | | |
|---|---|---|
| DE | 102 22 584 A1 | 12/2003 |
| EP | 1 137 997 B1 | 11/2002 |
| JP | 60246466 A * | 12/1985 |

* cited by examiner

METHOD AND APPARATUS FOR ALLOCATING BUS ACCESS RIGHTS IN MULTIMASTER BUS SYSTEMS

TECHNICAL FIELD

The present invention relates to a method and an apparatus for allocating bus access rights in multimaster bus systems, particularly in systems on a semiconductor chip (systems on a chip).

BACKGROUND OF THE INVENTION

The bus system connects the various units in a computer system (memory, CPU, peripheral units) to one another and conveys the data interchange between them. The components of the electronic data processing system use a common transport path, the bus system(s), to which they are connected in parallel.

The coordination of the transmission, i.e. the selection of sender and receiver, the respective access and also the time synchronization are controlled by means of control signals. In the simplest case, bus control is performed by a sole bus master.

Basic execution of a data transfer on the respective bus system with a sole master which controls the access occurs essentially in three steps.

First, the master device provides an address for selecting a communication partner on the address bus in the bus system. The selected partner identifies this and goes into standby. By activating a control signal, for example for a read or write access operation, the master device determines the direction of transmission. The sender or slave device determined in this manner places the data onto the data bus. The master device performs the data transfer and signals that data transfer has concluded by deactivating the read or write signal. This returns the bus system to the initial state and means that it is ready for a subsequent transfer.

In "multimaster bus systems", a plurality of master devices are authorized, in principle independently of one another, to use the bus system to address slave devices. To avoid collisions and disturbances during access via the bus system, a bus access rights controller needs to be provided in multimaster bus systems. A bus access rights controller normally uses a selection method (arbitration) to grant combinations of master devices and slave devices the respective access via the bus system.

Particularly in whole systems today which are integrated on a single semiconductor chip, "systems on a chip", with multiple masters, it is desirable for the arbitration to be as flexible as possible. Only in this way is it possible to use the appropriate selection method which best matches a target application, for example an engine controller, an antilocking system, a signal processor in mobile radio applications etc.

On the basis of the prior art, two particular selection methods for bus access rights control are in use. On the basis of the priority selection method, all master devices are allocated a priority value. In the event of simultaneous access requests from various master devices, the arbitration controller or bus access rights controller always selects the requesting master device which has the highest priority for access to the bus system. Priority-controlled bus access allocation guarantees that urgent tasks, that is to say combinations of master and slave devices, are handled with priority. However, this may result in processes which have low priority never being executed. This is called starvation of a process.

On the basis of the second important access rights allocation method, the round robin method, all processes or bus access requests from master devices are executed in a fixed order. The round robin method therefore ensures that all active processes or requests from master devices to access slave devices via the bus system are assigned a guaranteed bus access time. In the case of the round robin method, however, all bus access operations, or requests to use the bus system for access, also have the same very long waiting time, which results from the maximum latencies of all the simultaneously active master devices. This means that bus system access which is more frequent or more important in a respective application is disadvantaged and the speed of the whole system on the semiconductor chip with an on-chip bus system and multiple masters is slowed.

Stipulating a single arbitration method or method for allocating bus access rights in multimaster bus systems has the fundamental drawback that the arbitration chosen in this manner cannot be optimum for all applications or target applications for the respective system on a chip.

SUMMARY OF THE INVENTION

It is therefore an aspect of the present invention to provide a method for allocating bus access fights in multimaster bus systems which, particularly in systems on a chip, can be matched flexibly to the respective target application of the system and which very largely prevents bus access requests from waiting for one another or starvation.

According to one embodiment of the invention a method for allocating bus access rights in a multimaster bus system is provided which has the following steps:

a) addresses are explicitly allocated to master devices in the multimaster bus system;

b) a priority value from an organized priority list of priority values is assigned to each master device provided in the multimaster bus system;

c) requests from at least one master device to use the bus system to access a slave device are received;

d) the priority values of all requesting master devices are compared;

e1) if a sole requesting master device has the highest priority value:

sole access to the respective slave device is granted to the requesting master device which has the highest priority value; or e2) if a plurality of requesting master devices have the same highest priority value:

access to the respective slave devices is successively granted to the requesting master devices which have the highest priority value on the basis of the address allocation of the master devices.

Neither priority-controlled allocation of the access rights nor a round robin method is used. The combination and programming or assignment of addresses and priority values to the master device involved mean that the exemplary method according to the embodiment of the invention for allocating bus access rights can be adapted to suit any target applications for the corresponding system on a chip with a multimaster bus system and its master and slave devices. Addresses and priority values can be allocated in programmable fashion and hence with particular flexibility. This may reduce the risk of starvation, deadlocks or lifelocks in the bus system.

In another embodiment of the method, at least one priority value for a master device is altered after at least one of the access granting steps. By changing during operation of the system on a chip, it is possible to change the importance or urgency of a master device or particular access combinations in response to various requests in various performance sections of the operation.

In a further embodiment, for each combination comprising a slave device and a requesting master device the corresponding master device is assigned a priority value. This enables the implementation of implement a "crossbar". In this case, each master device can be coupled to each slave device, which means that an arbitration controller connected upstream of the slave device is granted access via the bus system in line with embodiments of the method in the event of a plurality of master devices accessing the corresponding slave device.

In yet another embodiment of the method, the requests from the master device to use the bus system to access a slave device are recorded. This also means that, after a predetermined number of times that access has been granted, at least one master device can be granted a requested access if it has not been granted a request over the predetermined number of times that access was granted. This also means that, after a predetermined number of times that access has been granted, the address allocation of the master devices can be taken as a basis for successively granting those master devices a requested access which has not taken place previously over the predetermined number of times that access was granted. The starvation of particular processes or requests to access the bus system can be prevented and the whole system may aquire real-time capability.

A further exemplary embodiment provides a multimaster bus system having a bus system, having a first number of master devices which are coupled to the bus system, having a second number of slave devices which are coupled to the bus system, and having at least one bus access fights controller which is likewise coupled to the bus system. In this case, the bus access rights controller allocates each master device an explicit address and allocates each master device a priority value from an organized priority list of priority values. The master devices input requests to use the bus system to access slave devices into the bus system, and the bus access rights controller receives the requests from the master devices and compares the corresponding priority values of the requesting master devices. If a sole requesting master device has the highest priority value, the bus access rights controller grants that master device which has the highest priority value the access to the respective slave device via the bus system. On the other hand, if a plurality of requesting master devices have the same highest priority value, the bus access rights controller successively grants the master devices which have the highest priority value the access to the respective slave devices via the bus system on the basis of the address allocation.

Provision is advantageously made for the assignment of the priority values to the master devices to be programmable. This allows the priority value structure or the underlying method of access rights control to be modified at any time and adapted to suit the respective application. p In another embodiment, the bus access rights controller has, for each slave device, a bus access rights control unit which respectively assigns each master device a priority value. Each master device can be coupled to all bus access rights control units. This would produce a "crossbar", where each bus access rights controller or each arbitrator is associated with the respective slave device and decides which master is given access to the slave device.

The bus access rights control units each may have registers for storing the priority values of the master devices.

In yet another embodiment of the multimaster bus system, the bus access rights controller has a memory device for recording the access requests from the master devices. This documentation of the bus access allows the bus access rights controller to initiate measures which prevent the starvation of processes. By way of example, after a predetermined number of times that access has been granted, the bus access rights controller takes the recorded access requests as a basis for granting at least one master device a requested access which has not been granted over the predetermined number of times that access was granted. Alternatively, after a predetermined number of times that access has been granted, the bus access rights controller can take the recorded access requests as a basis for successively granting, on the basis of the address allocation of the master devices, those master devices a requested access which has not been granted over the predetermined number of times that access was granted.

In another embodiment of the multimaster bus system, the bus access rights controller has a CPU. In this special case, the bus access rights control is performed by a central processor unit in the CPU which may contain embodiments of a method for allocating bus access rights in the form of program code.

Further refinements and developments of the invention are covered by the claims and in the description and with reference to the figures.

BRIEF DESCRIPTION OF THE DRAWINGS

Embodiments of the invention are explained below with reference to the schematic figures and exemplary embodiments. In the figures:

In the figures, elements which are the same or have the same function are provided with the same reference symbols unless stated otherwise.

FIG. 1 shows a multimaster bus system in line with the invention.

A bus access rights controller 1 is provided which is coupled to the bus system 2, the latter being shown schematically in this case. In addition, a first number of master devices 3-1, 3-2, . . . , 3-N are provided which are each likewise coupled to the bus system 2. A second number of slave devices 4-1, 4-2, . . . , 4-M are provided which are also coupled to the bus system 2. Each of the master devices 3-1, 3-2, . . . , 3-M has an explicit address associated with it.

Figure 2:
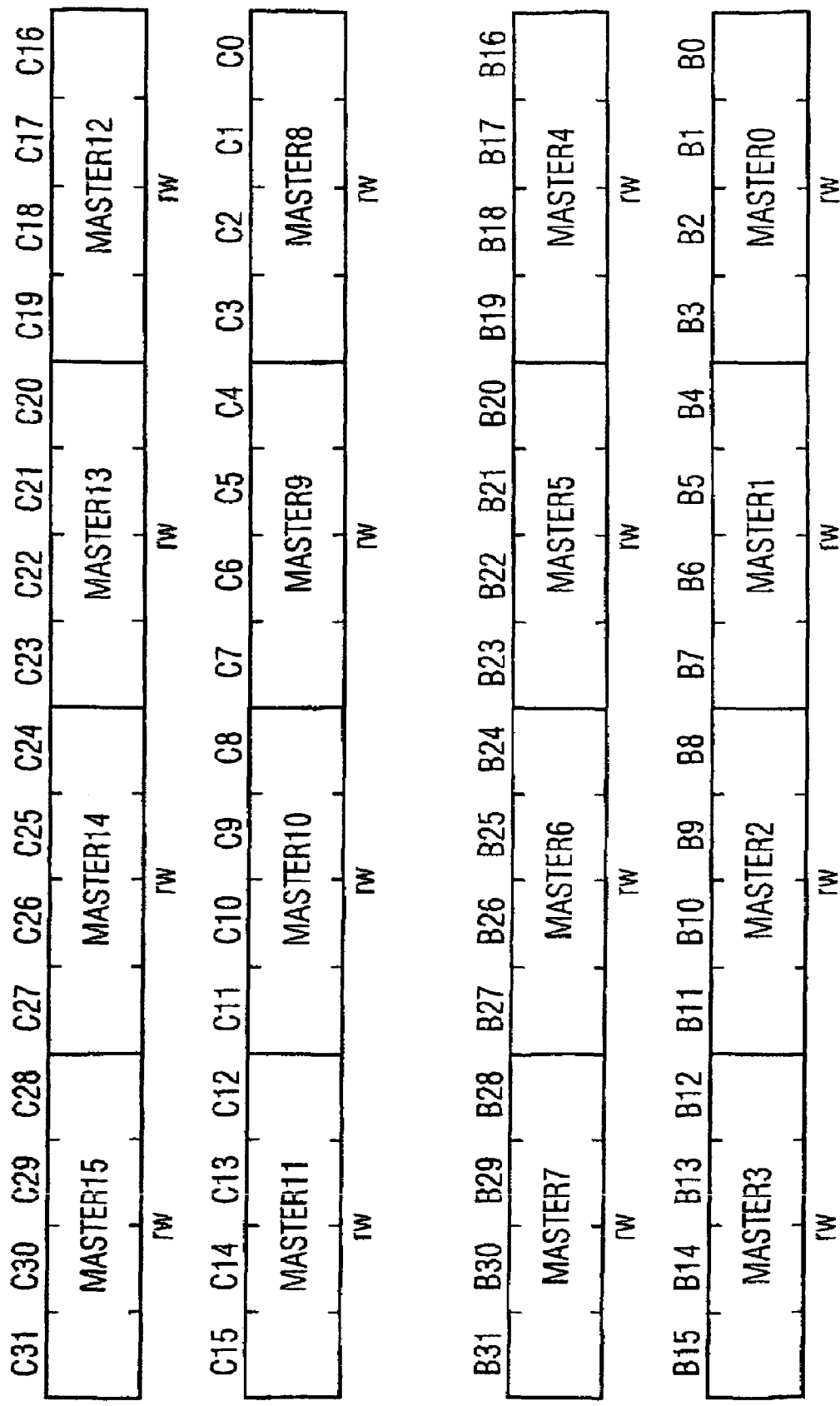
FIG. 2 shows a priority and address list for master devices.

An example of address allocation is shown in FIG. 2, in which sixteen master devices have the respective associated addresses MASTER0-MASTER15. In this specific case of N=16 master devices, 4 bits are provided for each address. The first master device, for example 3-1 with the address MASTER0, is represented by the first four bits B0, B1, B2, B3 in an address word, for example. FIG. 2 shows two address words which are each 32 bits in length, which means that two times eight master devices 3-1, . . . , 3-16 can respectively be allocated a respective address MASTER0-MASTER15.

Besides the addresses, the bus access rights controller 1 allocates each master device a priority value which is selected from an organized priority list of priority values.

Figure 3:
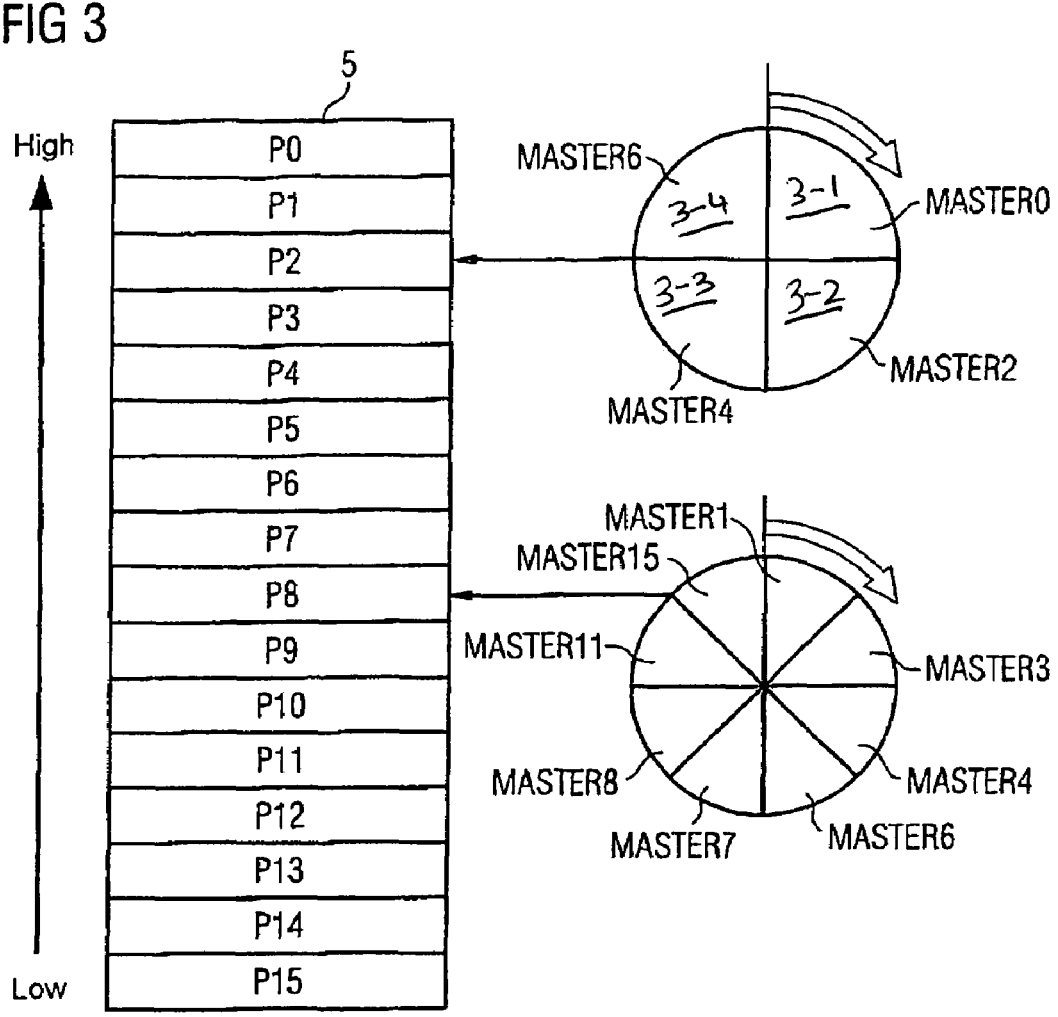
FIG. 3 shows an access rights granting scheme.

FIG. 3 shows an example of a priority list 5 for sixteen priority values for master devices. In this case, a priority value thus has a length of four bits by way of example. A priority value P0 has the highest associated priority, and a priority value P15 has the lowest associated priority. In this case, a plurality of master devices 3-1, . . . , 3-N may also be allocated the same priority value. Addresses are assigned explicitly, however.

The master devices 3-1, 3-2, . . . , 3-N or some of the master devices now request the use of the bus system to access a respective slave device 4-1, 4-2, . . . , 4-M. The bus access rights controller receives these requests from the master devices 3-1, 3-2, . . . , 3-N and compares the corresponding priority values associated with the requesting master devices with one another. If the requesting master devices 3-1, . . . , 3-N all have different priority values, for example the priority values P0, P5 and P15 in the case of three requesting master devices 3-1, 3-2, 3-3, the bus access rights controller 1 grants the use of the bus system to access the requested slave device 4-1, 4-2, . . . , 4-M only to the master device which has the priority value 0.

However, the inventive bus access rights controller also allows a plurality of master devices to have the same priority value. In this case, the corresponding access rights of the requesting master devices 3-1, . . . , 3-N which have this same value are allocated on the basis of a method similar to the round robin method.

The master devices 3-1, . . . , 3-N are thus combined in groups, with the master devices in each group having the same priority values. Within the group, the access rights are distributed cyclically in the case of simultaneously requesting master devices from the group, specifically in an order corresponding to the addressing.

If, by way of example, eight master devices each have an associated priority value P8 and the corresponding master devices request access via the bus system, the bus access rights controller 1 decides as follows: all eight master devices are successively granted access, with the order being stipulated by the explicit addresses of the respective master devices.

In the example illustrated in FIG. 3, the master devices having the addresses MASTER1, MASTER3, MASTER4, MASTER6, MASTER7, MASTER8, MASTER11 and MASTER15 have the associated priority value P8. The sequence of the bus access operations granted is stipulated by the arrangement in the two address words B0-B15, C0-C15, as shown in FIG. 2. When all eight master devices with the same assigned priority value P8 have performed their bus access, the bus system is ready again and the bus access rights controller 1 processes access requests from master devices again in line with the invention.

Figure 4:
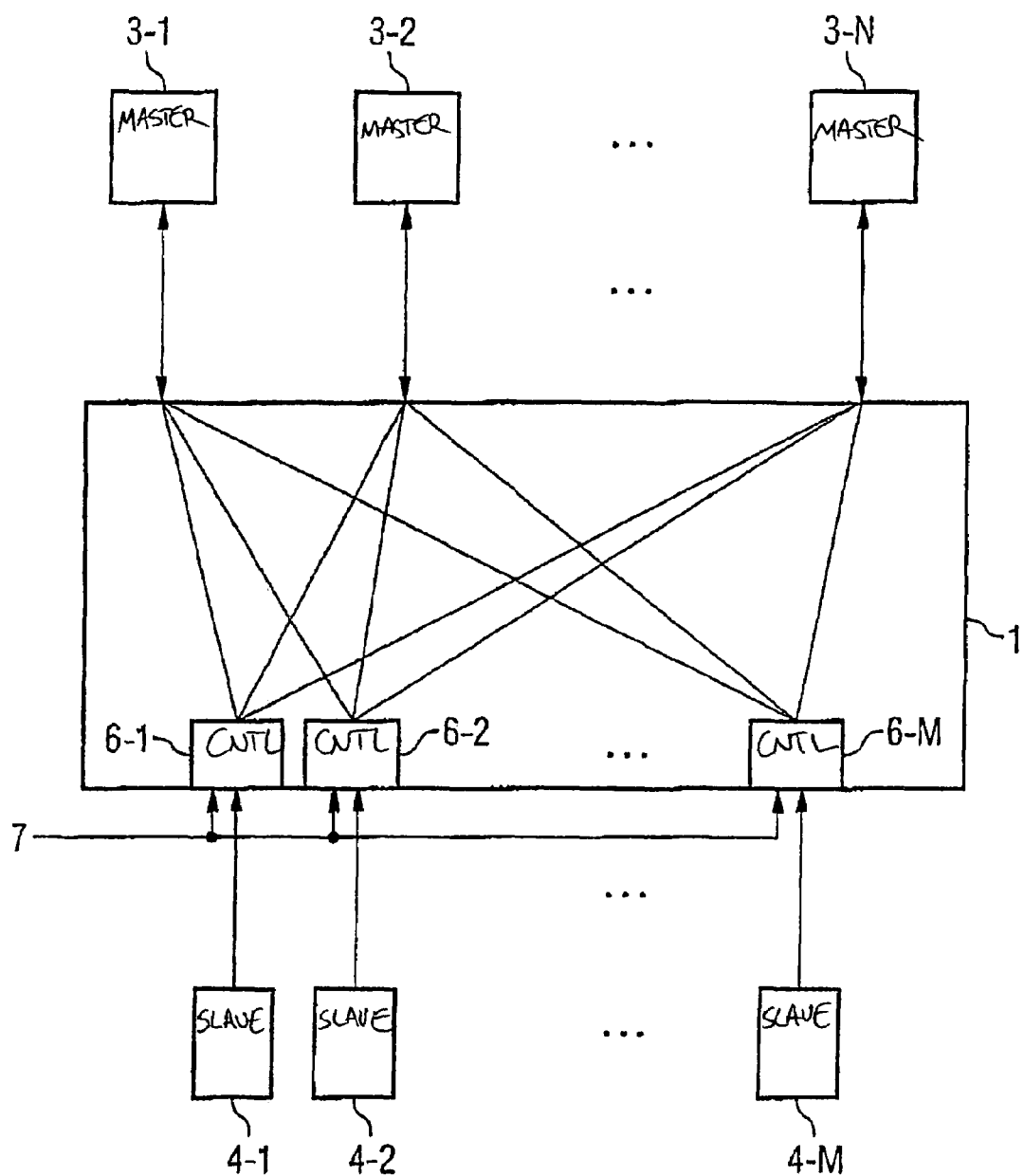
FIG. 4 shows a multimaster bus system with cross-coupled master and slave devices.

FIG. 4 shows an alternative embodiment of a multimaster bus system with cross-coupled master and slave devices in line with the invention.

N master devices 3-1, 3-2, . . . , 3-N are provided which are respectively coupled to the bus access rights controller 1. In addition, there is a second number M of slave devices 4-1, 4-2, . . . , 4-M which are likewise coupled to the bus access rights controller 1.

Each slave device 4-1, 4-2, . . . , 4-M has an associated bus access rights control unit 6-1, 6-2, . . . , 6-M, to which the respective slave devices 4-1, 4-2, . . . , 4-M are coupled. In addition, each of the bus access rights control units 6-1, 6-2, . . . , 6-M is connected to each master device 3-1, 3-2, . . . , 3-N. The bus access rights controller 1, which has the bus access rights control units 6-1, 6-2, . . . , 6-M, thus represents a "crossbar".

The bus access rights control units 6-1, 6-2, . . . , 6-M are programmable. The bus access rights control units 6-1, 6-2, . . . , 6-M each have registers which are used to store the priority values of all master devices. Programming signals 7 can be used to program these priority values. The crossbar arrangement thus assigns a priority value for each combination of a slave device 4-1, . . . , 4-M and a master device 3-1, . . . , 3-N. In addition, the crossbar arrangement allows a first group of master devices to request respective access to a first slave device and simultaneously a second group of master devices to request access to a second slave device in parallel.

Figure 1:
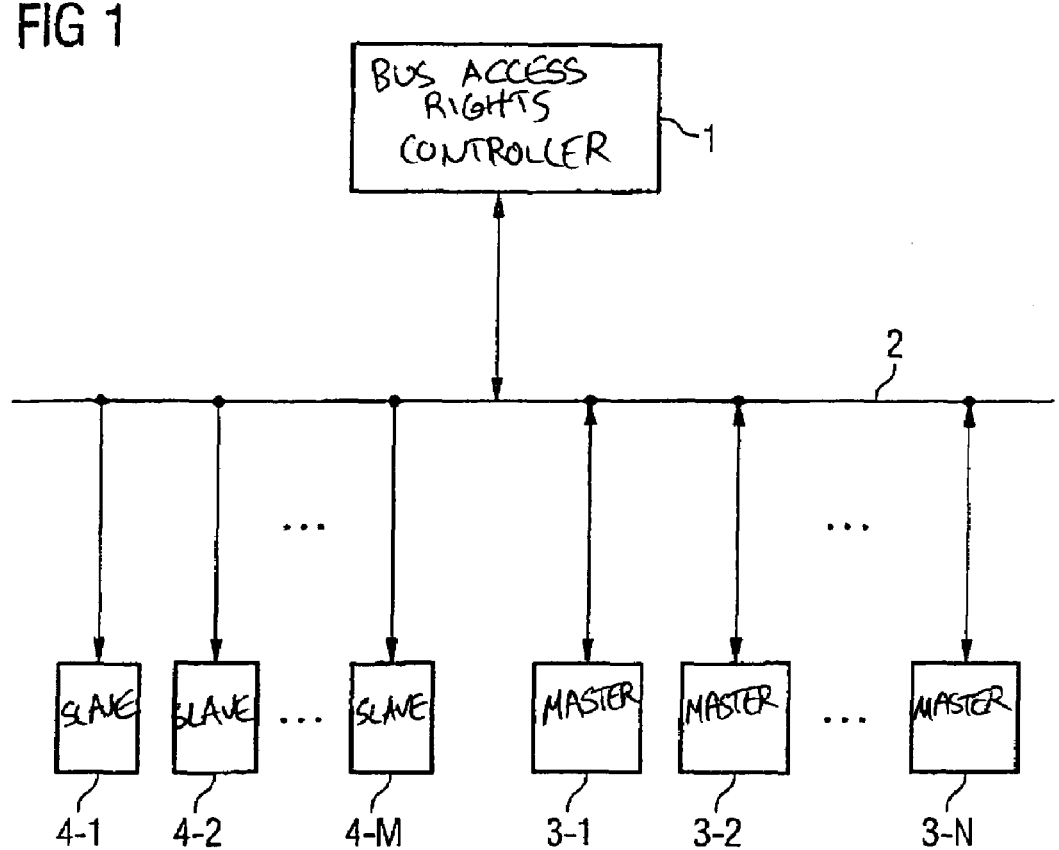
FIG. 1 shows a multimaster bus system with bus access rights control.

Bus access rights are allocated in line with the comments relating to FIGS. 1 to 3. By way of example, access to the first slave device 4-1 by four master devices 3-1, 3-2, 3-3, 3-4 having the associated addresses MASTER0, MASTER2, MASTER4 and MASTER6 is shown.

Since each of the requesting master devices 3-1, 3-2, 3-3, 3-4 is coupled to the bus access rights control unit 6-1 which is connected upstream, the latter evaluates the requests and decides about the bus access or access to the slave device 4-1.

The bus access rights control units 6-1 has stored in its registers the priority values of the master device 3-1, 3-2, 3-3, 3-4. In this example, the allocated priority value is the value P2 for all requesting master devices 3-1, 3-2, 3-3, 3-4. Since all requesting master devices have the same priority value, the bus access rights control unit 6-1 carries out a round robin allocation method for the four requesting master devices 3-1, 3-2, 3-3, 3-4. In this case, the order is stipulated by the addresses of the respective master devices.

As FIG. 3 shows, first the master device 3-1, which has the associated address MASTER0, then the master device 3-2, which has the associated address MASTER2, then the master device 3-3, which has the associated address MASTER4, and finally the master device 3-4, which has the associated address MASTER6, are processed or permitted bus access or access to the slave device 4-1 in the respective order.

Since the bus access rights control units 6-1, 6-M are in programmable form, it is also possible to alter the arbitration or the bus access rights allocation during operation of the respective system on a chip on which the multimaster bus system has been produced. This means that the respective priority of the users or of the master and slave devices can be adapted to suit the final application of the semiconductor chip with its system in optimum fashion. The drawbacks of the priority method, that master/slave access operations which have only subordinate priority or have a low priority value are never granted bus access and that the pure round robin method grants bus access operations which have urgent or relatively high priority only insufficient bus access, are prevented in line with the invention by the programmable bus access rights controller and the corresponding inventive method.

Although the present invention has been described with reference to preferred exemplary embodiments, it is not limited thereto but rather can be modified in a wide variety of ways.

In particular, a large number of groups of round robin access operations are conceivable, and not just two round robin groups, as indicated in the example. The programmable design means that it is likewise possible to combine further groups of master devices or access to slave devices by master devices such that access is first allocated to that master device which has the highest priority, then a round robin phase is performed for master devices having the same priority value, and also the bus access requests which have lower priority values are attended to.

The master devices are also not necessarily coupled to all slave devices or bus access rights control units in the preferred embodiment. It is equally possible for just sub-combinations of master and slave devices to be connected to one another.

LIST OF REFERENCE SYMBOLS

1 Bus access rights controller
2 Bus system
3-1, . . ., 3-N Master device
4-1, . . ., 4-M Slave device
MASTER0-MASTER15 Addresses
B0-B15, CO-C15 Addresses bits
6-1, 6-2, . . ., 6-M bus access rights control unit
7 Programming signals
5 Priority list

The invention claimed is:

1. A method for allocating bus access rights in a multi-master bus system comprising:
 allocating addresses explicitly to master devices;
 assigning a priority value from an organized priority list of priority values to each master device;
 receiving requests from at least one master device to use the bus system to access a slave device;
 comparing the priority values of all requesting master devices;
 if a group of requesting master devices have the same highest priority value, successively granting access to the respective slave devices to all master devices of the group of requesting master devices which have the highest priority value on the basis of the address allocation of the master devices of the group;
 wherein sole access is granted successively to all master devices of said group before further requests from master devices to use the bus system to access a slave device are processed.

2. The method as claimed in claim 1, wherein at least one priority value for a master device is altered after at least one of the access granting steps.

3. The method as claimed in claim 1, wherein for each combination comprising a slave device and a requesting master device the corresponding master device is assigned a priority value.

4. The method as claimed in claim 1, wherein the requests from the master device to use the bus system to access a slave device are recorded.

5. The method as claimed in claim 1, wherein after a predetermined number of times that access has been granted, at least one master device is granted a requested access which has not been granted over the predetermined number of times that access was granted.

6. The method as claimed in claim 1, wherein after a predetermined number of times that access has been granted, the address allocation of the master devices is taken as a basis for successively granting those master devices a requested access which has not been granted over the predetermined number of times that access was granted.

7. A multimaster bus system having:
 a) a bus system;
 b) a plurality of master devices which are coupled to the bus system; the master devices submitting request to use the bus system to access slave devices in to the bus system;
 c) a plurality of slave devices which are coupled to the bus system;
 d) at least one bus access rights controller coupled to the bus system, the bus access rights controller allocating each master device an explicit address and assigning each master device a priority value from an organized priority list of priority values;
 wherein the master devices are configured to submit requests to use the bust system to access slave devices into the bus system; and
 the bus access rights controller is configured to receive the requests from the master devices, compare the corresponding priority values of the requesting master devices, and grant access to all requesting master devices of a group of master devices which have a common highest priority value the access to the respective slave devices on the basis of their address allocation if said group of requesting master devices have the same highest priority value,
 wherein after having successively granted access to all master devices of said group, additional requests from master devices to use the bus system to access a slave device are processed.

8. The multimaster bus system as claimed in claim 7, wherein the assignment of the priority values to the master devices is programmable.

9. The multimaster bus system as claimed in claim 7, wherein the bus access rights controller has, for each slave device, a bus access rights control unit which respectively assigns each master device a priority value.

10. The multimaster bus system as claimed in claim 9, wherein each master device can be coupled to all bus access rights control units.

11. The multimaster bus system as claimed in claim 10, wherein the bus access rights control units each have registers for storing the priority values of the master devices.

12. The multimaster bus system as claimed in claim 7, wherein the bus access rights controller has a memory device for recording the access requests from the master devices.

13. The multimaster bus system as claimed in claim 12, wherein after a predetermined number of times that accesses have been granted, the bus access rights controller takes the recorded access requests as a basis for granting at least one master device a requested access which has not been granted over the predetermined number of times that access was granted.

14. The multimaster bus system as claimed in claim 12, wherein after a predetermined number of times that access has been granted, the bus access rights controller takes the recorded access requests as a basis for successively granting, on the basis of the address allocation of the master devices, those master devices a requested access which has not been granted over the predetermined number of times that access was granted.

15. The multimaster bus system as claimed claim 7, wherein the bus access rights controller has a CPU.

16. The multimaster bus system as claimed in claim 7, wherein the master and slave devices and the bus access rights controller are integrated on a chip.

* * * * *